United States Patent

[11] 3,550,839

| [72] | Inventors | William J. Clayton<br>Fairport;<br>Robert J. Miller; Clair C. Smith, Holcomb, N.Y. |
|---|---|---|
| [21] | Appl. No. | 816,429 |
| [22] | Filed | Dec. 16, 1968 |
| [45] | Patented | Dec. 29, 1970 |
| [73] | Assignee | Mobil Oil Corporation<br>a corporation of New York<br>Division of Ser. No. 442,323, Mar. 24, 1965, Pat. No. 3,466,212. |

[54] DOUBLED WALLED PLASTIC BAG
2 Claims, 12 Drawing Figs.

[52] U.S. Cl. ..................................................... 229/55, 150/0.5
[51] Int. Cl. ...................................................... B65d 33/02

[50] Field of Search ............................................ 229/55, 53; 150/0.5, 3, 7

[56] References Cited
UNITED STATES PATENTS

| 3,084,984 | 4/1963 | Adler | 229/55 |
| 3,269,643 | 8/1966 | McDowell | 229/55 |
| 3,346,173 | 10/1967 | Smith et al. | 229/55 |

Primary Examiner—David M. Bockenek
Attorneys—Oswald G. Hayes, Donald L. Dickerson and James D. Tierney ABSTRACT: A double-walled thermoplastic bag comprising a flattened tube formed from a thermoplastic laminate, the tube being sealed at one end and the double walls of the bag being heat sealed together along a plurality of intersecting heat sealed areas.

INVENTORS
WILLIAM J. CLAYTON
ROBERT J. MILLER
CLAIR C. SMITH

PATENTED DEC29 1970 3,550,839

INVENTORS
WILLIAM J. CLAYTON
ROBERT J. MILLER
CLAIR C. SMITH

INVENTORS
WILLIAM J. CLAYTON
ROBERT J. MILLER
CLAIR C. SMITH

INVENTORS
WILLIAM J. CLAYTON
ROBERT J. MILLER
CLAIR C. SMITH

3,550,839

DOUBLED WALLED PLASTIC BAG

CROSS REFERENCE TO RELATED APPLICATION

This application is a division of copending application Ser. No. 442,323, filed Mar. 24, 1965, now U.S. Pat. No. 3,466,212.

The present invention relates to embossed thermoplastic films, laminations of embossed thermoplastic films and, more particularly, to methods for manufacturing such film products.

In certain techniques disclosed in the prior art, embossments have been formed upon the surface of single or multiple layers of film products by employing embossing rolls, or the like, which serve to mechanically imprint a desired pattern upon the surface of a film by a physical, permanent distortion of the film surface. Heat is sometimes employed in such embossing operations to soften the plastic material thereby facilitating the impression of a desired pattern into the surface of a film and also insuring, to a degree, a permanent type embossment of the film surface.

It is also known in the prior art to form embossed laminar products. This may be accomplished by well known vacuum forming techniques whereby a single layer of film is subjected to vacuum application in selected areas, resulting in a plurality of concave distentions of the film surface and, subsequently, a smooth film is applied to one or both sides of such a vacuum embossed film to form an embossed, laminar structure. Generally, such a procedure is time consuming, the vacuum being applied to the base sheet of film in successive, incremental, stages and the lamination procedure likewise requiring separate processing steps.

In accordance with the teachings of the present invention, film may be formed into embossed structures and embossed, laminar, structures utilizing an extremely simple and efficient processing technique.

Additionally, the process of the present invention may be employed to produce embossed, laminar, products which have air bubbles encapsulated therein, in a predetermined, patterned, configuration.

For a more complete understanding of the process of the present invention, reference may be had to the accompanying drawings wherein.

In the practice of the present invention, use is made of a raised embossing and sealing pattern 15, of substantial height and, for example, of a height sufficient to provide on the film surface a difference in elevation larger than is provided by normal printing or coating of such a surface. Generally speaking, in the practice of the present invention the raised pattern 15 is at least 4 mils in height and more preferably from about 10 to about 50 mils.

Figure 1:
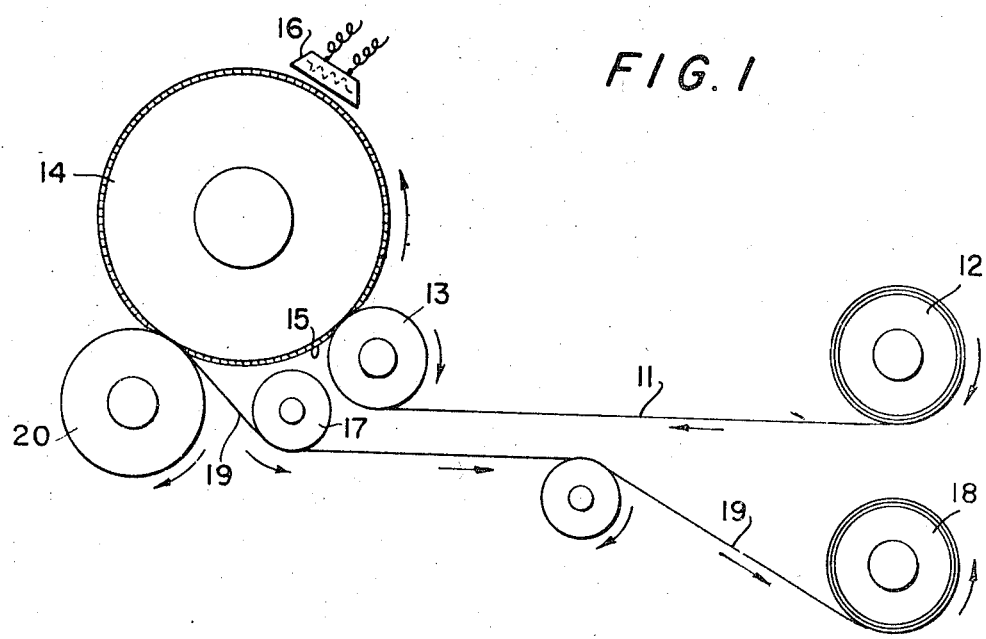
FIG. 1 is a side view in elevation, largely diagrammatic, of an apparatus suitable for practice of the process of the present invention.
Figure 4:
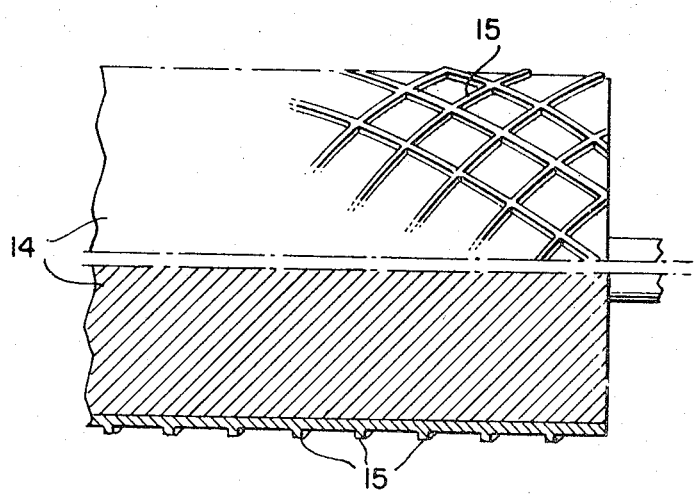
FIG. 4 is an elevational view on an enlarged scale, partly in section, of a type of raised, patterned, surfaced cylinder which may be employed in the process of the present invention.

As illustrated in FIG. 1, film 11 from continuous film supply roller 12 is fed under roller 13. Resilient surfaced (e.g. sponge) roller 13 impresses film 11 onto the face of a continuously moving support, e.g. a moving belt or a rotating cylinder as illustrated by 14 in FIG. 1. Cylinder 14 is maintained at a constant temperature utilizing conventional techniques e.g. by the circulation of fluids therein such as water, or by the employment of refrigerant gas-containing coils inserted therein, or any other suitable cooling means. The surface of cylinder 14, is embossed in a desired raised pattern 15 such as a repetitive pattern of raised intersecting lines to form squares or, for example, diamond shaped areas as illustrated in FIG. 4. As sponge roller 13 impresses film 11 against the raised pattern carried upon the face of cylinder 14, those portions of film 11, not in contact with portions of raised pattern 15, since they are somewhat pliable, are distended and forced to assume a slightly concave configuration in those areas intermediate the raised pattern. As the film is rotated past the nip formed by sponge roller 13 and cylinder 14, the plurality of concave configurations, impressed upon the film surface by sponge roller 13, remain. The film itself is now adhesively secured to the raised pattern carried by cylinder 14 by virtue of an infrared absorbing, (e.g. carbon-black impregnated) adhesive coating carried upon the surface of raised pattern 15. As cylinder 14 rotates in a counterclockwise direction, it carries film 11, now adhesively secured to raised pattern 15, past a source of heat energy 16. As a suitable source of heat, one or more infrared emitting, quartz-type lamps may be used, however for purposes of the present invention it will be understood that any source of radiant heat energy may be employed such as e.g. electrically heated coils or the like. When film 11, thus secured to raised pattern 15, is exposed to heat source 16, the film is selectively heated. Those areas which are in contact with raised pattern 15, by virtue of the presence of the infrared heat-absorbing carbon-black material present in the adhesive coating, are rapidly heated to a relatively high temperature at which the thermoplastic becomes slightly molten, while those portions of the film not in contact with raised pattern 15 are heated to a relatively lower temperature sufficient to cause the slightly concave film portions within the cavity areas created by raised pattern 15 to assume a more pronounced concave configuration. As film 11, still adhesively secured to raised pattern 15 carried on the surface of cylinder 14, passes infrared heat energy source 16, by virtue of the continuous counterclockwise rotation of cylinder 14, it is fed under and around separator roll 17, thereby stripping it from the adhesive coating on the surface of raised pattern 15, and finally to windup roller 18 or to a further processing step.

Figure 5:
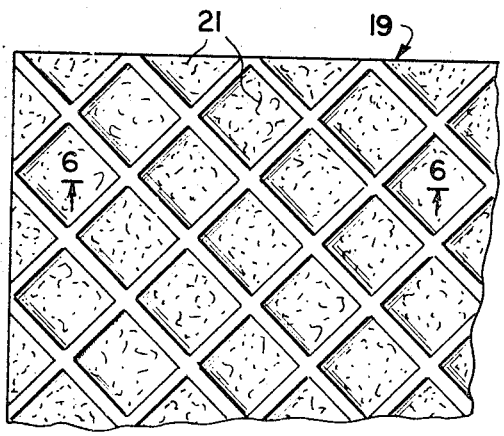
FIGS. 5, 6, 7, 8, 9 and 10 are plan and cross-sectional views, partly broken away, illustrating various structural configurations of the embossed thermoplastic materials produced in accord with the process of the present invention.
Figure 6:

As an example of the process embodiment described above, a continuous length of polyethylene film having an approximate gauge of 0.5 mil was feed from a supply roller 12 under a sponge surfaced roller 13 and into nipping engagement with a raised pattern 15 carried upon the surface of a rotating cylinder 14, rotating at a speed of about 50 ft./min. The pattern consisted of paperboard, perforated to form a series of intersecting raised lines, approximately 20 mils thick, thereby resulting in a series of diamond shaped configurations, as illustrated in FIG. 4. The surface of the pattern was coated with a 10-mil thickness of a carbon-black impregnated adhesive composition. Rotating cylinder 14 was maintained at a temperature of approximately 110° F. Subsequently, the film, adhesively secured to the adhesive coated surface of the raised pattern, was advanced by the rotating cylinder past two, 2400 watt, infrared emitting, quartz-type lamps. The lamps were positioned approximately 6 inches from the surface of the film. Finally the embossed film product was stripped from the adhesive surface of the raised pattern utilizing a takeoff roller, as illustrated at 17 in FIG. 1, and fed to a windup roller. FIGS. 5 and 6 are illustrations of the embossed thermoplastic film which is produced by the foregoing process.

Figure 2:
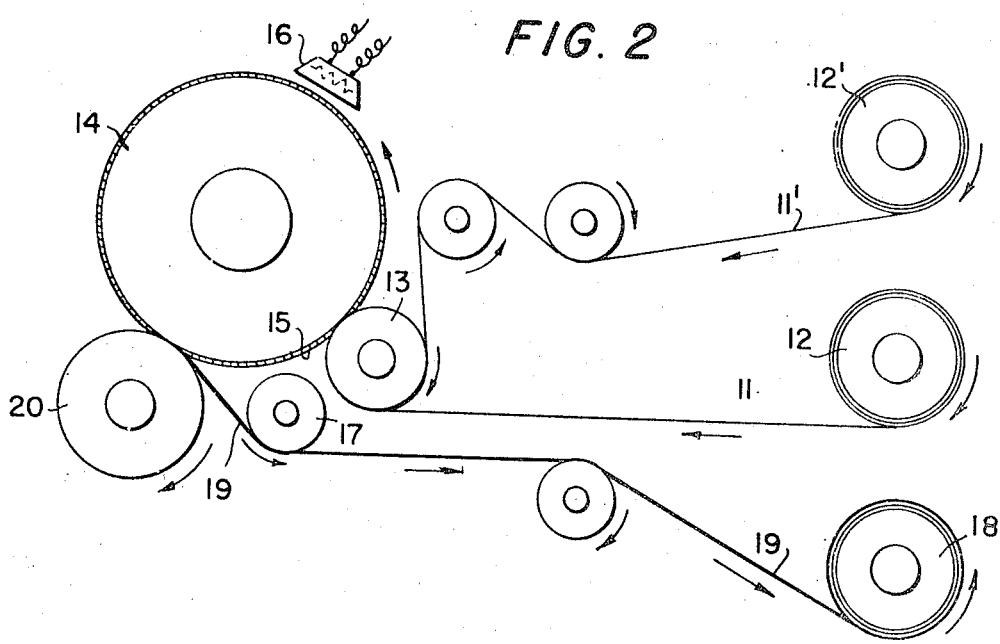
FIGS. 2 and 3 are similar to FIG. 1, illustrating apparatus useful to produce embossed, laminar products in accord with process of the present invention.

In another embodiment of the process of the present invention, as illustrated in FIG. 2, laminar embossed films may be produced which may consist of two or more layers, bonded together in areas corresponding to raised pattern 15. As illustrated in FIG. 2, two films 11 and 11' are fed from individual supply rollers 12 and 12' and are subsequently impressed in superposed relationship against the raised pattern 15 carried on the surface of cylinder 14 as they are fed under sponge roller 13 and into the nip formed by sponge roller 13 and continuously rotating cylinder 14. This nipping action forces the film layers to assume a slightly concave configuration in those areas not supported by raised pattern 15 on cylinder 14 and also causes that portion of the surface of film layer 11, contacting raised pattern 15, to become adhesively secured thereto by virtue of the infrared absorbing adhesive coating upon the surface of raised pattern 15. This adhesive fixation of film layer 11, together with the plurality of concave configurations impressed upon the surface of both layers after passing through the nip formed by counterrotating rollers 13 and 14, secures the film layers in fixed relationship with respect to one another and to rotating cylinder 14, thereby facilitating further processing of the superposed film layers. Next, the film layers, by virtue of the rotation of cylinder 14 upon which they are supported, are carried past the source of heat energy 16 described above. When the film layers 11 and 11' become thus exposed to the heat energy emitting from source 16, they are heat welded together only in those areas of the film layers which are backed by the raised infrared absorbing pattern 15, which absorbs the radiant heat from source 16 and elevates the temperature of the film in contact therewith causing film layer 11 to become heat sealed to film layer 11' along a pattern directly corresponding to that of raised pattern 15, and thereby forming laminate structure 19.

It has been found desirable to sometimes employ smooth surfaced roller 20, extending across the face of rotating cylinder 14, to complete the sealing operation. Roller 20 may be a Teflon-coated roller which is employed to insure positive sealing of laminar layers 11 and 11' by positively impressing them together in the nip formed by roller 20 and rotating cylinder 14, after laminar structure 19 is carried by rotating cylinder 14 past the heat energy source 16. Thereafter, laminate structure 19 is fed under and around roll 17, thereby stripping it from the carbon-black impregnated, adhesive-coated surface of raised pattern 15 and finally to windup roller 18 or to a further processing step such as a slitting operation, or for example a bag making process.

Figure 7:
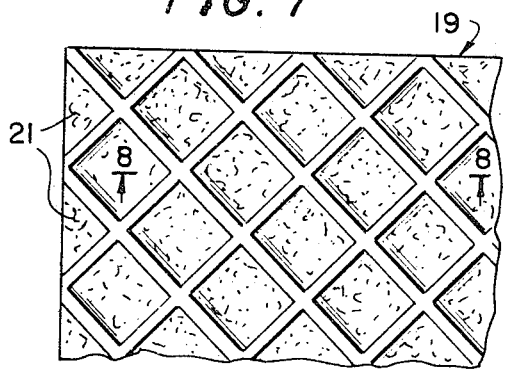
Figure 8:
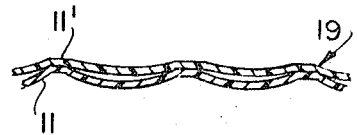

As illustrated in FIGS. 7 and 8, the face of laminate 19, which was adjacent to raised pattern 15 during the sealing operation, has convex distentions in those areas which were not in direct contact with raised pattern 15 during the heat sealing operation. The opposite side of laminate 19 has less pronounced concave distentions on the surface thereof in those areas opposite the concave distentions of the reverse side of laminate 19. Laminate structure 19 is further characterized by having minute wrinkles formed immediately adjacent the areas of film layers which have been sealed, thereby imparting a crinkled appearance to the laminate structure, as in those areas illustrated at 21 in FIG. 5. Although this minute wrinkling may be caused by a combination of factors, it is theorized that it is mainly a result of the differential heating of the surfaces of film layers 11 and 11', those areas of the film supported by the carbon black impregnated adhesive carried by raised pattern 15 being heated to a higher temperature than the film areas intermediate the raised pattern lines. These very minute wrinkles impart a unique appearance to the embossed laminar structure, giving it a quilted appearance similar to that of quilted textile materials.

Figure 3:
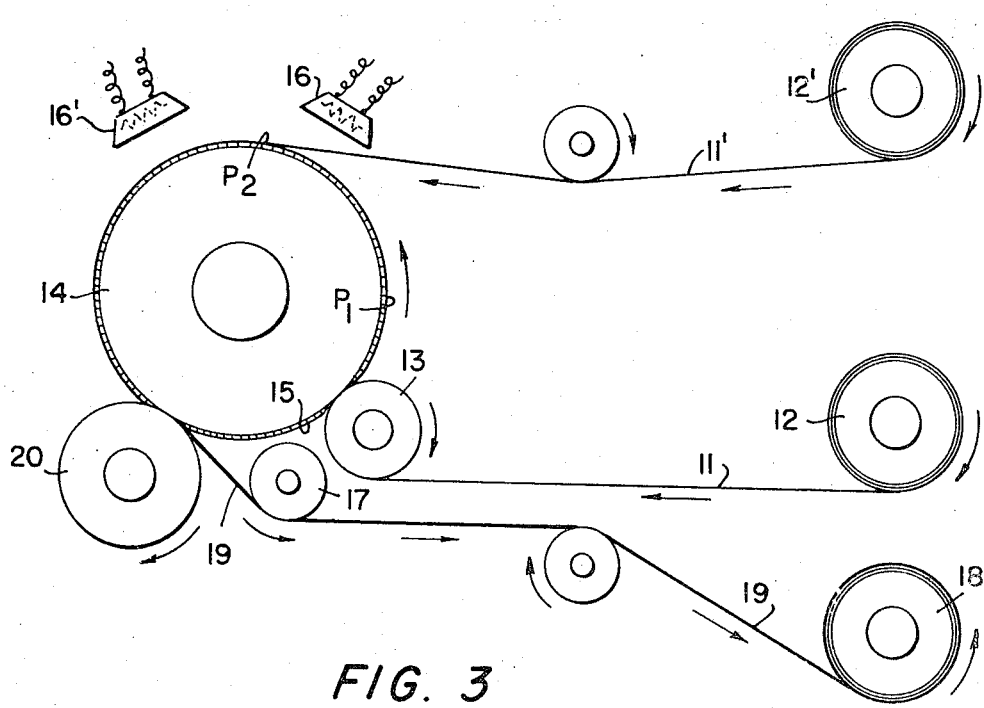

In a particular example of the laminating and embossing process described above, continuous lengths of polyethylene film, each with an approximate gauge of 0.5 mil, were fed from supply rollers 12 and 12' under sponge roller 13 and into nipping engagement with raised pattern 15 carried upon the surface of a rotating cylinder, illustrated as 14 in FIG. 2. The cylinder was rotated at a speed of about 50 ft./min. Cylinder 14 was maintained at a temperature of approximately 80° F. It should be noted that the internal cooling of cylinder 14 is necessitated by its continued exposure to heat source 16, which has a tendency to raise the temperature of cylinder 14 well above operable process conditions. The circulation of a coolant such as water through cylinder 14 eliminates this undesirable rise of temperature. Next, the polyethylene film layers were rotated past heat source 16. In the present example, two 2400 watt infrared, quartz-type lamps were used as a source of radiant heat energy. These lamps were positioned, as illustrated at 16 in FIG. 2, approximately 6 inches from the surface of the superposed film layers. Finally the embossed, laminar film product, still carried upon raised pattern 15, was fed between the nip of a counterrotating Teflon-coated roller, as illustrated at 20 in FIG. 2, to insure positive bonding of the film layers and finally the laminar product was stripped off the adhesive-coated surface of pattern 15 utilizing a takeoff roller, such as 17 in FIG. 2, and fed to a windup roller. It has been found that the positioning of roller 17, when it is removing the laminar product, is important in that it must be positioned so that the lamination leaves the embossing cylinder in a direction substantially perpendicular to the surface thereof, in order to avoid damage, such a permanent distortion or delamination of the embossed laminar product. FIG. 3 illustrates another embodiment of the process of the present invention. Film layer 11 is fed, from continuous supply roller 12, under sponge roller 13 and into the nip formed by sponge roller 13 and raised pattern 15 carried on rotating cylinder 14. Film layer 11, now with slight concave distentions on its exposed surface and adhesively secured to the infrared absorbing adhesive coating of raised pattern 15, is carried, by virtue of the counterclockwise rotation of cylinder 14, past heat energy source 16. As film layer 11 is exposed to the heat energy source 16 the portions of film layer 11, not in contact with raised pattern 15 tend to expand and assume a more pronounced concave configuration as described above. As film layer 11 passed heat source 16, a second film 11' of substantially the same width as film 11 is fed from continuous supply roller 12' over the top of film layer 11 and thereupon the contacting film layers 11 and 11' are passed under a second radiant heat source 16' as illustrated in FIG. 3. The film layers are sealed together, as a result of the heat absorption by the carbon black present in the adhesive coating on raised pattern 15, in those areas supported by pattern 15.

Figure 9:
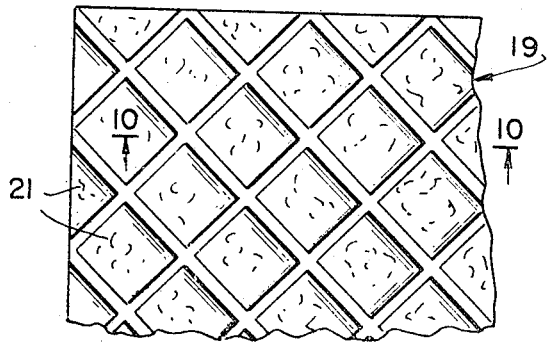
Figure 10:
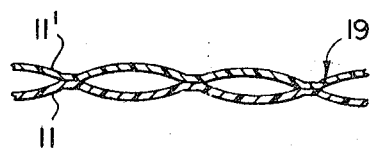

As illustrated in FIGS. 9 and 10, there is no sealing together of those portions of the film layers which are not supported by the radiant heat absorbing pattern 15, since they are relatively transparent to the radiant heat-sealing energy. Conversely, a pronounced separation of those portions of the film layers intermediate the raised pattern 15, occurs. This results from the fact that air has been entrapped in the area between the concave distentions of film layer 11 and those portions of film layer 11' covering these concave distentions. As a result the air, entrapped by the radiant heat sealing together of adjacent film areas in contact with raised pattern 15, expands as a result of the heat from source 16 and forces the unsealed portions of the film layers to expand thereby resulting in a plurality of entrapped air bubbles intermediate those areas of film adhesively secured to raised pattern 15. The film laminate 19' may now be passed into a nip formed by smooth surfaced roller 20 and rotating cylinder 14 to insure adequate sealing of the film areas supported by raised pattern 15, which nipping action mechanically presses the film layers tightly together to insure positive sealing of those portions of the film layers supported on raised pattern 15.

Thereafter, laminar film structure 19 is fed under and around roll 17, thereby stripping it from the carbon-black impregnated adhesive coating of raised pattern 15, and finally fed to a windup roller 18 or to further processing steps.

It has been found that the volume of air which is encapsulated between the film layers in those unsealed areas intermediate the intersecting seal lines may be varied by varying the location at which film layer 11' joins film layer 11. If, as illustrated in FIG. 3, film layer 11' is fed onto the surface of film layer 11 at point $P_1$, the amount of air which is encapsulated between the unsealed film areas results in a laminar product having air bubbles on that surface of the lamination which was in contact with raised pattern 15 during the forming operation. The opposite surface of such a lamination, i.e. the side of the lamination not in direct contact with raised pattern 15 is relatively smooth and flat. On the other hand, if film layer 11' joins film layer 11 at a point $P_2$, intermediate radiant heat sources 16 and 16', the size of the encapsulated bubbles in the final laminate product is greatly increased, both surfaces of the laminate structure having convex distentions as a result of a relatively large volume of air being encapsulated intermediate the opposing unsealed film layers adjacent the intersecting heat sealed areas. As is apparent from the foregoing, the volume of air entrapped between the film layers, and therefore the size of the air bubbles encapsulated in the final product, may be varied by varying the point at which film layer 11' is joined in superposed relationship with film layer 11.

The adhesive composition, which is employed as a coating upon the surface of raised pattern 15, may be any adhesive material which is capable of adhesively securing film layer 11 in fixed relationship to the surface of pattern 15, and which will allow for the ready removal of the finished embossed film product from the surface of raised pattern 15 without destroying the film or its embossed surface design. Suitable for that purpose is a carbon-black adhesive mixture of the following composition:

TABLE I

| Coating component: | Percent by weight |
| --- | --- |
| Neoprene | 45.0 |
| Phenolic Resin | 45.0 |
| Linseed Oil | 7.0 |
| Carbon Black | 3.0 |

The neoprene coating component imparts flexibility to the coating and good aging characteristics, as well as being a film former, while the phenolic resin imparts toughness, and adhesiveness or tack to the coating.

The linseed oil, which has a tendency to migrate to the surface of the applied coating composition, acts as a release agent, facilitating the removal of the finished film product from the surface of the adhesive-coated, raised pattern, without seriously impairing the film bonding properties of the adhesive composition. The carbon-black component, which is dispersed throughout the adhesive composition, functions to absorb incident infrared radiation, selectively transferring, by conduction, the resultant heat energy absorbed to that portion of the film surface in contact with coated, raised, pattern 15.

The foregoing carbon-black adhesive mixture formulation is given merely as an illustrative example of a type of adhesive system which is operable in the present process. Numerous other adhesives may also be employed, as would be apparent to those skilled in the art.

The thickness of the adhesive mixture which is applied to the surface of raised pattern 15 may vary within wide limits dependent upon such variable factors as the specific adhesive formulation employed, the thicknesses of the thermoplastic films which are to be embossed and/or laminated together, the intensity of the heat emanating from radiant heat energy source 16 and the rate of rotation of cylinder 14, for example. Generally, the coating thickness may vary from about 0.5 mil to about 50 mils and preferably from about 5 mils to about 25 mils.

Raised pattern 15 may be formed on the surface of cylinder 14 using well known prior art techniques such as conventional engraving methods whereby a series of intersecting raised lines in a predetermined pattern may be formed upon the surface of the cylinder. Another method which may be employed to form the desired raised pattern upon the surface of cylinder 14 is to utilize a precut pattern, fabricated from materials such as paperboard or the like, which is adhesively secured to the surface of cylinder 14. In addition to performing quite satisfactorily in the process of the present invention, this latter method of raised pattern formation, i.e. utilizing a precut grid or pattern which is adhesively secured to a smooth surfaced cylinder, avoids the attendant expenses which arise from the employment of costly engraved cylinder members.

Figure 11:
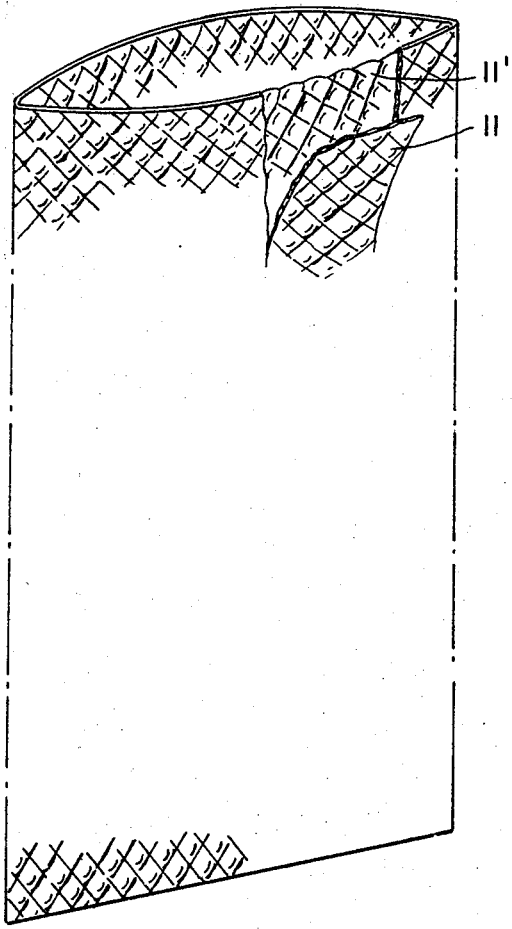
FIGS. 11 and 12 are illustrations of various types of bag structures which may be produced utilizing the embossed thermoplastic materials made in accord with the process of the present invention.

The embossed laminar thermoplastic material of the present invention is ideally suited for many applications and in particular packaging applications such as overwrap material or bag structures, for example. A bag structure, as illustrated in FIG. 11, fabricated from the embossed laminar film produced in accordance with the instant process has advantages not found in typical prior art thermoplastic bag constructions. Among these advantages are the ease with which the bags themselves may be opened. As a result of the lamination and embossment of the component wall layers of the bag, the film loses much of its inherent limpness becoming stiffer and easier to handle during opening and filling operations. In addition, the bags themselves possess thermal insulation properties by virtue of the air encapsulated between the layers of the laminar structure, making bags of this type useful in the refrigeration storage of fresh or frozen foods and the like. As shown in FIG. 11 the bags are formed of tubes of the thermoplastic film laminate of the present invention which are heat sealed along their bottom end.

Figure 12:
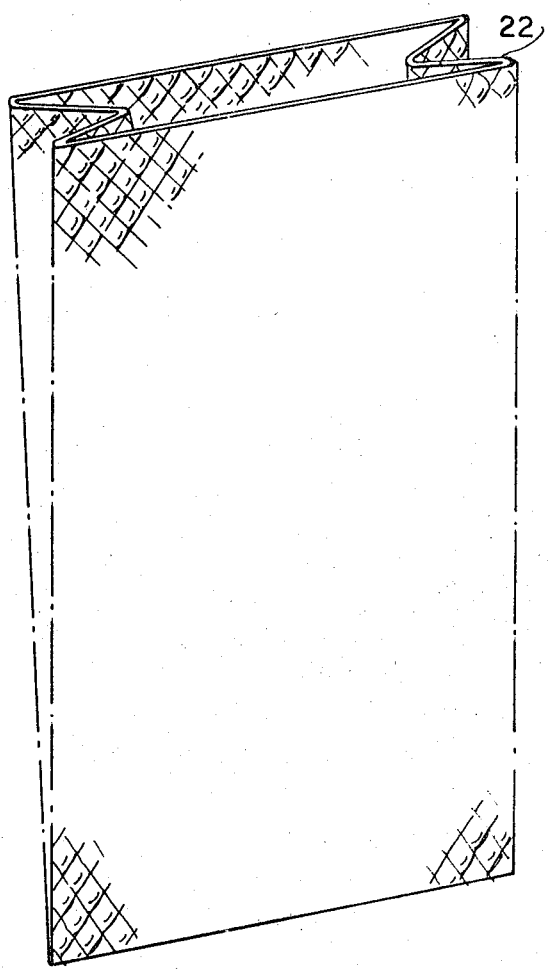

As illustrated in FIG. 12 the bags, fabricated with the embossed, laminar film of the present process may also have sidewall gusetts 22 which are commonly employed in this type, i.e. thermoplastic, bag construction.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

We claim:
1. A thermoplastic bag which comprises a flattened tube of a thermoplastic film laminate, said tube being sealed along one end thereof, said thermoplastic film laminate consisting of at least two layers of thermoplastic film heat welded together along a plurality of intersecting heat sealed areas wherein layers of thermoplastic film adjacent said intersecting heat seal lines contain encapsulated air.

2. A thermoplastic bag, in accordance with claim 1, wherein said flattened tube is gusetted.